UNITED STATES PATENT OFFICE.

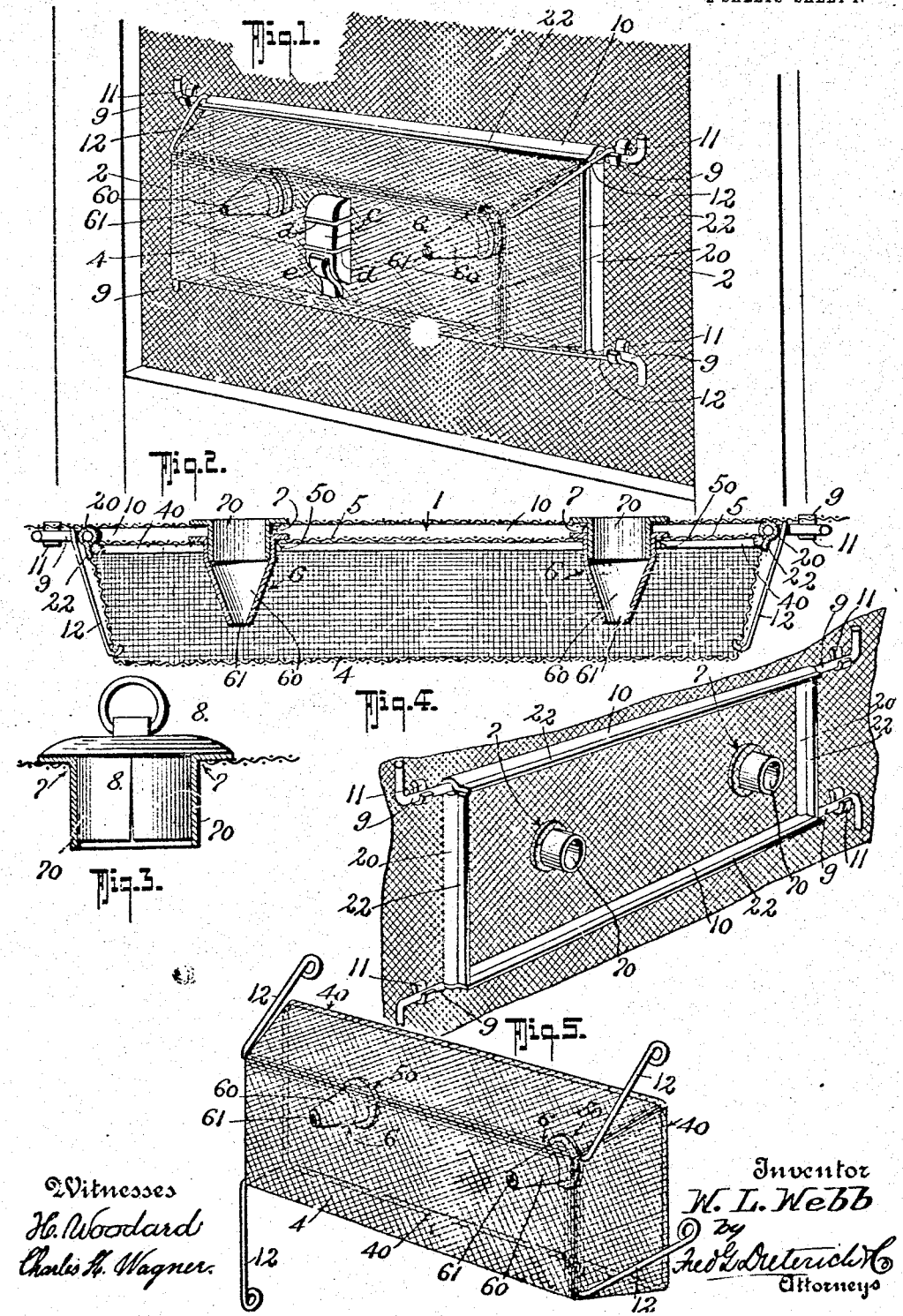

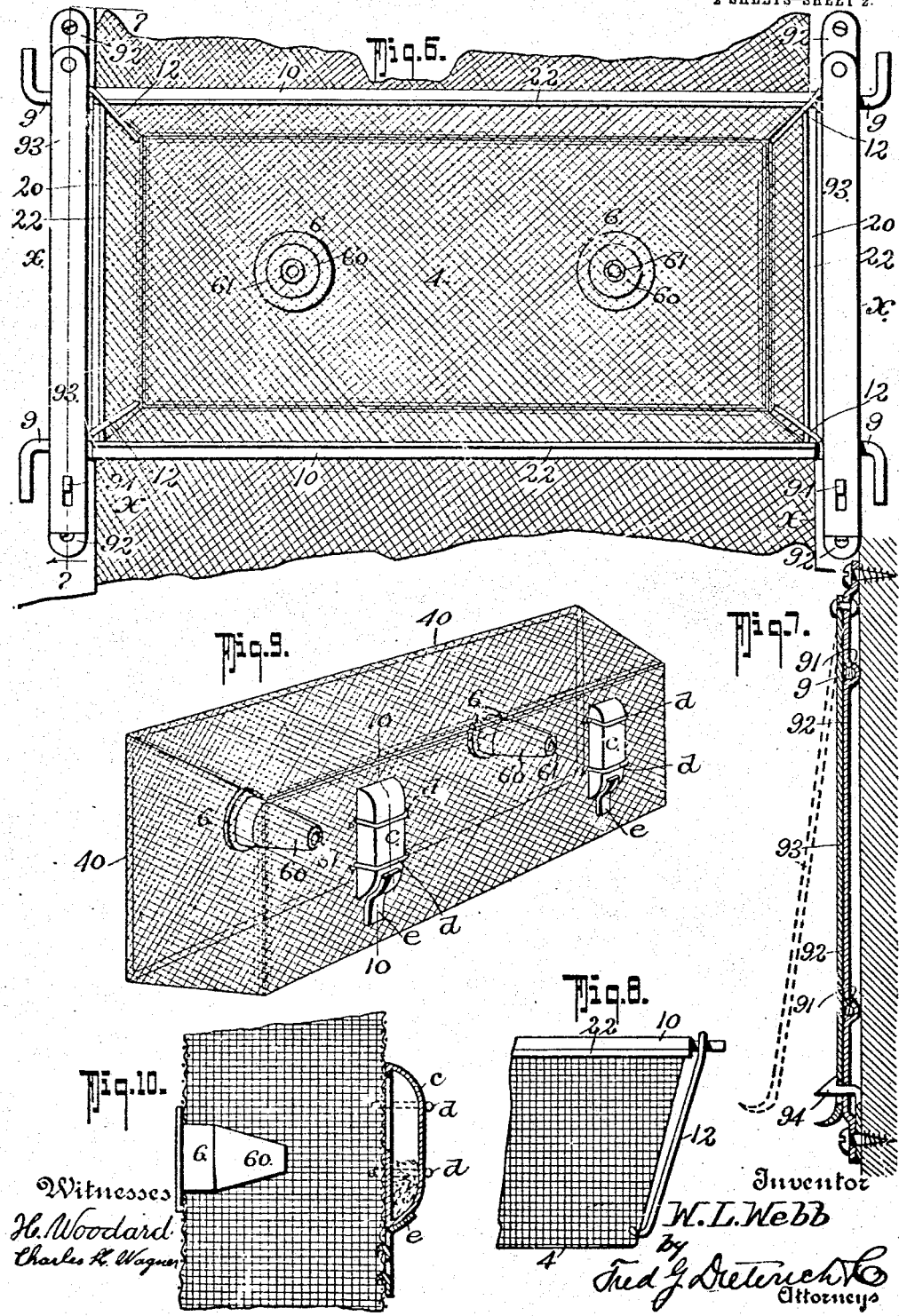

WILBUR L. WEBB, OF BRIDGEWATER CORNERS, VERMONT.

FLY-TRAP FOR SCREENS.

989,314.   Specification of Letters Patent.   Patented Apr. 11, 1911.

Application filed November 2, 1910.   Serial No. 590,346.

*To all whom it may concern:*

Be it known that I, WILBUR L. WEBB, residing at Bridgewater Corners, in the county of Windsor and State of Vermont, have invented a new and Improved Fly-Trap for Screens, of which the following is a specification.

This invention relates to improvements in that class of insect traps, especially designed for being removably connected to window and door screens for trapping flies and other insects, and the said invention primarily has for its object to provide a means of the general character stated, of a simple and economical construction, that can be readily removably secured to the window or door screen and is especially adapted for entrapping the flies as they swarm toward the opening in the window or door screen bodies.

My invention comprises generally a holding means mounted upon a door screen around a passage for the insects arranged for coöperating with an improved construction and arrangement of a trap or collecting chamber, together with locking devices whereby the trap can be quickly fastened in place on door or window screens of different widths and whereby the said trap can be quickly removed for emptying the contents thereof.

In its subordinate or specific nature, my invention consists in certain details of construction and peculiar arrangement of parts, all of which will be hereinafter fully explained, specifically pointed out in the appended claims and illustrated in the accompanying drawings, in which:—

Figure 1, is a perspective view of a part of a screen door with my invention applied. Fig. 2, is a horizontal section thereof taken substantially on the line 2—2 of Fig. 1, the bait holder and box being omitted. Fig. 3, is a vertical section of a portion of screen door with the trap member proper removed and the insect opening or passage shown closed. Fig. 4, is a detail perspective view of a part of the screen door and more particularly discloses the holder or supporting portion of the trap. Fig. 5, is a perspective view of the removable trap member. Fig. 6, is a detail view that illustrates the trap attached to the side rail of a solid door. Fig. 7, is a vertical section thereof on the line 7—7 on Fig. 6. Fig. 8, is a plan view of one end of the trap and shows in detail one of the swinging locking links for securing the two parts of the trap together. Fig. 9, is a detail view of another form of the removable trap member. Fig. 10, is a cross section thereof on the line 10—10 of Fig. 9.

In its practical arrangement, my improved fly trap comprises a body formed of two parts, which, under normal conditions, are held interlocked to produce a central chamber or pot in which the insects are trapped and which may be readily separated when it is desired to dump or destroy the pests.

In the drawing 1 designates the front or holder part of the trap and it consists of upper and lower holder devices 10—10 and vertical end tubes 20—20, the said several tubes 10 and 20 being formed of tin bent up to shape and having one edge bent outwardly at right angles to the body whereby to form guard flanges 22, the purpose of which will be presently explained.

4 designates the trap portion, proper, preferably tray shaped, and whose upper marginal edge is formed of a rod member 40 bent to produce the side and end members of the said edge, as clearly shown in Fig. 5. The body of the trap 4 is of stout wire mesh to form a close screen and the said screen portion is bent to the shape required in any approved manner, the ends being wound upon or secured to the marginal rod 40.

5 designates the front screen body of the trap which is secured to the tubes 10 and 20 in any approved manner and which at intervals has openings 50—50 in which are fastened cone shaped tunnels or passages 6 that extend into the trap or chamber 4, the inner portion 60 being reduced to form restricted outlets 61. The front part 5 of the trap is removably mounted upon and fastened to the door or window screen which also has openings 7—7 that register with the tunnels 6 in the trap front, and for properly guiding the flies or other insects into the tunnels 6 tubular nozzles 70—70 are secured in the openings 7—7 that telescope with the outer ends of the tunnels 6 as is clearly shown in Fig. 3, by reference to which it will be observed that the said nozzles also serve as convenient holders for the plugs 8—8 that close the openings 7—7 in the window or door screen when the trap is removed for emptying the contents thereof.

9—9 designate solid rods, the outer ends of which are bent at right angles to form handles and these rods as will be noticed in the drawings are slidable through hanger loops 11—11 secured to the door screen in any suitable manner and into the tubes 10—10 a suitable distance. For fitting the trap to the door the pair of rods 9—9 are slid into the opposite ends of each tube 10, such means for fastening providing for readily fitting the trap to different widths of the door or window screens.

12—12 designate link rods that are hinged at the outer ends to the corners of the trap body 4—4 to swing in the vertical plane of the sides thereof and these rods have eyes at their free or outer ends and the said rods are of such length that when they are swung over the sides of the trap, their eyes register with the tubes 10—10 so that in fitting the locking rods 9—9 into the said tubes they are slidable through the eyes of the rods 12, it being understood that the said rods serve as a means for locking the trap body 4 against the front wall 5, it being also understood from the drawings, that the marginal rod portion of the body 4 is made to fit snugly against the angle flanges of the tubes 10 and 20 to produce a tight connection for the two parts of the trap, it being further obvious that the flanges on the tubes serve to close the meeting edges of the front and back parts of the trap to prevent the escape of insects through the edges of the trap.

From the foregoing description, taken in connection with the accompanying drawings, it is believed that the complete construction and manner of use of my invention will be apparent.

By reason of constructing the several parts as described the trap can be easily mounted upon a door or window screen body and readily removed by simply lifting the lock rods 9 out of the loops that hold the trap on the door screen body. The inner trap can then be removed to the point of emptying and the pot or trap member 4 released from the front by simply pulling out the slide rods 9 and unhooking the locking rods 12.

In Fig. 9, I have shown a modified form of the removable tray portion of the trap provided with a baiting means for enticing the flies to and through the nozzles 60, one of the said means being used in connection with each of the fly passages. The bait device consists of a hollow elongated member c the lower portion of which is closed to form a receiver for holding a bait, for example, sugar and vinegar, and for increasing the efficiency of the bait holders they are placed on the back of the trap tray in line with the entrance nozzle 60. The device c is detachably held on the tray in any well-known manner, preferably by loops d and brackets e secured to the screen body of the trap tray, as clearly shown in Fig. 10.

In Figs. 6 and 7 I have shown how the trap can be supported from the side rails of the door and in this form, the rods 9 extend onto the sills x—x and seat in transverse grooves 91 on hanger plates 92 secured to the sills x, the said rods being held in place by the spring metal strip 93 that is pivotally connected on the plate 92 to swing in the plane therefrom, but laterally, to uncover the plate 92 on which the strip 93 is held locked by spring latch 94, it being apparent from Fig. 7 the strip 93 is sufficiently resilient to be bent outwardly, see dotted lines, when it is desired to release the rods 9.

Having thus described my invention, what I claim is:

1. The combination with a screen having an opening, of a screen trap composed of two separable parts, one of which includes a frame, the other includes a cage having a front wall provided with an opening to register with the screen opening, and a single means for locking the two parts of the trap together and securing said trap to said screen.

2. The combination with a screen having an opening for the passage of insects, hangers carried by said screen; of a two-part trap, one of which consists of a frame, means for securing said frame to said hangers, the other trap part consisting of a cage having front, back, end and side walls and removably held on said frame, and means carried by said cage for engaging said frame, securing devices for retaining said cage on said frame, said cage having an opening in one wall to oppose the opening in said screen.

3. A two-part trap, one of which consists of a supporting frame, means carried by said frame through the medium of which said frame may be secured to a door or window, the other trap part consisting of a cage having front, back side and end walls and adapted to removably seat in said frame, and means carried by said cage for engaging said frame supporting means to retain said cage seated in said frame, said cage having an opening in one wall.

4. The combination with a door or window having an opening for the passage of insects therethrough; of a trap comprising a separate front and rear portion, the front including upper and lower tubes and a tunnel or passage for communicating with the opening in the window or door, the back portion including a margin shaped to fit closely against the front, link arms having eyes pivotally mounted on the rear portion of the trap so the eye portions will swing over the ends of the tubes, and rods slidable through the eyes of the hangers, and into the tubes for securing the two parts of the trap together, and means on the door or window for engaging the rods to hold the trap against the door or window.

5. In combination with a door or window having an opening, and hangers above and below the opening; of a trap formed of a separable front and back portion, the front having a tunnel opening to register with the opening in the door, said front including upper and lower and side tubes, said tubes having angle flanges, the rear part of the trap including a marginal rod shaped to fit closely against the front of the trap and the guard portions of the tubes thereof, locking devices consisting of eye rods hinged to the rear edges of the back part of the trap to swing with their eyes over the upper and lower hollow tubes, and pairs of slide rods for each of the upper and lower tubes, said rods being slidable through the eyes of the locking rods and into the said upper and lower tubes, said rods having portions to seat in the hangers on the window or door.

6. The combination with a door having an opening for the passage of insects; of a two-part trap consisting of a frame section and a cage section removably fitted into the frame section, said cage section having a screen wall provided with an entrance tunnel to communicate with the passage through the door, locking devices removably securing the cage and frame together and means for suspending the trap on the door over the opening therein.

7. In a trap of the character stated, a cage consisting of front, back, side and end walls, said cage having an entrance tunnel in one wall, a loop member secured to the outside of said cage, a support secured to said cage beneath said loop member, and a bait holding receptacle removably held by said loop member on said support, said bait holding receptacle having an opening adjacent to the wall of said cage.

WILBUR L. WEBB.

Witnesses:
H. G. DAVIS,
NELLIE A. DAVIS.